United States Patent
Hathaway et al.

(10) Patent No.: US 9,787,720 B2
(45) Date of Patent: Oct. 10, 2017

(54) LATERAL ACCOUNT MAPPING

(71) Applicant: Rapid7, Inc., Boston, MA (US)

(72) Inventors: Matthew Robert Hathaway, Newton, MA (US); Samuel Adams, Andover, MA (US); Jeff Myers, Somerville, MA (US); Steven Torance, Burlington, MA (US)

(73) Assignee: Rapid7, Inc., Boston, MA (US)

( * ) Notice: Subject to any disclaimer, the term of this patent is extended or adjusted under 35 U.S.C. 154(b) by 0 days.

(21) Appl. No.: 14/633,100

(22) Filed: Feb. 26, 2015

(65) Prior Publication Data

US 2016/0255114 A1 Sep. 1, 2016

(51) Int. Cl.
*H04L 29/06* (2006.01)
*G06F 21/62* (2013.01)

(52) U.S. Cl.
CPC .......... *H04L 63/20* (2013.01); *G06F 21/6218* (2013.01); *H04L 63/08* (2013.01); *H04L 63/1425* (2013.01)

(58) Field of Classification Search
CPC ..... H04L 63/20; H04L 63/0272; H04L 63/08; H04L 63/1425; G06F 21/6218
USPC ..................... 726/1, 2, 3; 713/168
See application file for complete search history.

(56) References Cited

U.S. PATENT DOCUMENTS

| | | | | |
|---|---|---|---|---|
| 6,023,762 A | * | 2/2000 | Dean | G06F 21/34 380/255 |
| 8,301,753 B1 | * | 10/2012 | Melvin | H04L 61/103 709/224 |
| 2009/0300589 A1 | * | 12/2009 | Watters | G06F 21/563 717/140 |
| 2011/0185055 A1 | * | 7/2011 | Nappier | H04L 63/08 709/224 |
| 2011/0258118 A1 | * | 10/2011 | Ciurea | G06Q 20/40 705/44 |
| 2012/0084438 A1 | * | 4/2012 | Raleigh | H04L 41/046 709/224 |
| 2013/0067062 A1 | * | 3/2013 | Gaitonde | H04L 61/103 709/224 |
| 2014/0283083 A1 | * | 9/2014 | Gula | H04L 63/1433 726/25 |
| 2015/0033315 A1 | * | 1/2015 | Gadamsetty | H04L 63/0807 726/8 |
| 2015/0058923 A1 | * | 2/2015 | Rajagopal | G06F 21/00 726/1 |
| 2015/0128274 A1 | * | 5/2015 | Giokas | H04L 63/1425 726/23 |

* cited by examiner

*Primary Examiner* — Sarah Su
(74) *Attorney, Agent, or Firm* — Danielson Legal LLC

(57) ABSTRACT

Systems and methods of correlating accounts among a plurality of network assets using account lateral movement data is presented in the context of network security. In one embodiment a plurality of authentication audit logs are received from a plurality of assets; the plurality of authentication audit logs are correlated; and a notification is generated based on a comparison of correlation results and a database of permitted account associations.

17 Claims, 5 Drawing Sheets

LATERAL ACCOUNT MAPPING

TECHNICAL FIELD

Embodiments of the invention generally relate to systems and methods for managing accounts used in a network environment, and more specifically to using event logs for network assets to track and manage accounts used among assets in a network.

BACKGROUND

For networks having multiple assets there may be different accounts active on each asset. Further, assets from different networks can be communicably linked to assets in other networks, each asset having different active accounts. Some of these different accounts may in fact be associated with each other, such as when they are associated with the same user. A user may authenticate using account "X" on a first network asset and then through machine-to-machine authentication authenticate using account "Y" on a second network asset. Machine-to-machine authentication may purposefully or incidentally obfuscate the identity of the account or the user through account switching.

Activity at a network asset may be monitored at an account level using various techniques, including event logs. The logged information may include the identity of the asset and the information for the account associated with the logged event. Presently, the typical process for reviewing event information is for a security professional to manually gather information from various event logs, after the fact, and piece together authentication attempts and correlate accounts. This is a time consuming process and prone to error. Further, these techniques do not leverage the information gathered about the accounts to improve or update network or asset policies, nor enable active network monitoring.

Accordingly, there is a need for robust systems and methods that will track and correlate machine-to-machine authentication and map accounts across network assets, including across multiple assets, in such a way as to describe how a user or account utilizes various assets on a network. There is also a need for systems and methods that will facilitate improvements to and updates to policy enforcement for account usage at a network and an asset level, providing part of a security and management ecosystem.

SUMMARY

In general, various aspects of the systems, methods, and apparatus described herein are directed toward the mapping of accounts across network assets and tracking the way a user utilizes multiple accounts to access various assets on a network. In addition, the system and methods described herein are directed to enforcing network policies based on the account mapping described above.

According to one aspect of the present invention a method of monitoring a network is provided. The method includes receiving a plurality of authentication audit logs from a plurality of assets, correlating the plurality of authentication audit logs; and generating a notification based on a comparison of correlation results and a database of permitted account associations.

In one embodiment, the plurality of authentication logs comprise a first authentication log from a first asset and a second authentication log from a second asset. The first authentication audit log may comprise destination data and account information local to the first asset, and the second authentication audit log may comprise origination data and account information local to the second asset.

In one embodiment, correlating the plurality of authentication audit logs comprises associating a first account from the first asset with a second account from the second asset. In one embodiment, the first asset and the second asset are network devices. In one embodiment, the database of permitted account associations comprises permitted account switches. In one embodiment, the method further comprises generating a visual map of the correlation of the plurality of authentication audit logs.

According to another aspect of the present invention a system of monitoring a network is provided. The system includes a database of permitted account associations, and a processing module configured to receive a plurality of authentication audit logs from a plurality of assets, correlate the plurality of authentication audit logs; and generate a notification based on a comparison of correlation results and the database of permitted account associations.

In one embodiment, the processing module is further configured to update the database of permitted account associations based on a user response to the notification. The plurality of authentication logs may comprise a first authentication audit log from a first asset and a second authentication log from a second asset. The first authentication audit log may comprise destination data and account information local to the first asset and the second authentication audit log may comprise origination data and account information local to the second asset.

In one embodiment, correlating the plurality of authentication audit logs comprises associating a first account from the first asset with a second account from the second asset. In one embodiment, the first asset and the second asset are network devices.

In one embodiment, the database of permitted account associations comprises permitted account switches. The permitted account switches may be based on account information and device information.

In one embodiment, the system further comprises a second database associating at least one device label with user information. The user may be identified based on the second database and an authentication record. The authentication record may be an Active Directory log. The device label may be a domain name or an Internet protocol address. The second database may be updated upon a dynamic host configuration protocol lease renewal, a virtual private network internet protocol address assignment, or both.

The foregoing and other features and advantages of the present invention will be made more apparent from the descriptions, drawings, and claims that follow. One of ordinary skill in the art, based on this disclosure, would understand that other aspects and advantages of the present invention exist.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Described herein are various embodiments of methods and systems consistent with the present invention. These embodiments are exemplary and should not be interpreted to limit the scope that one of ordinary skill in the art would give to the invention. In some instances, well-known operations are not described in detail to avoid unnecessarily obscuring the present invention.

Figure 1:
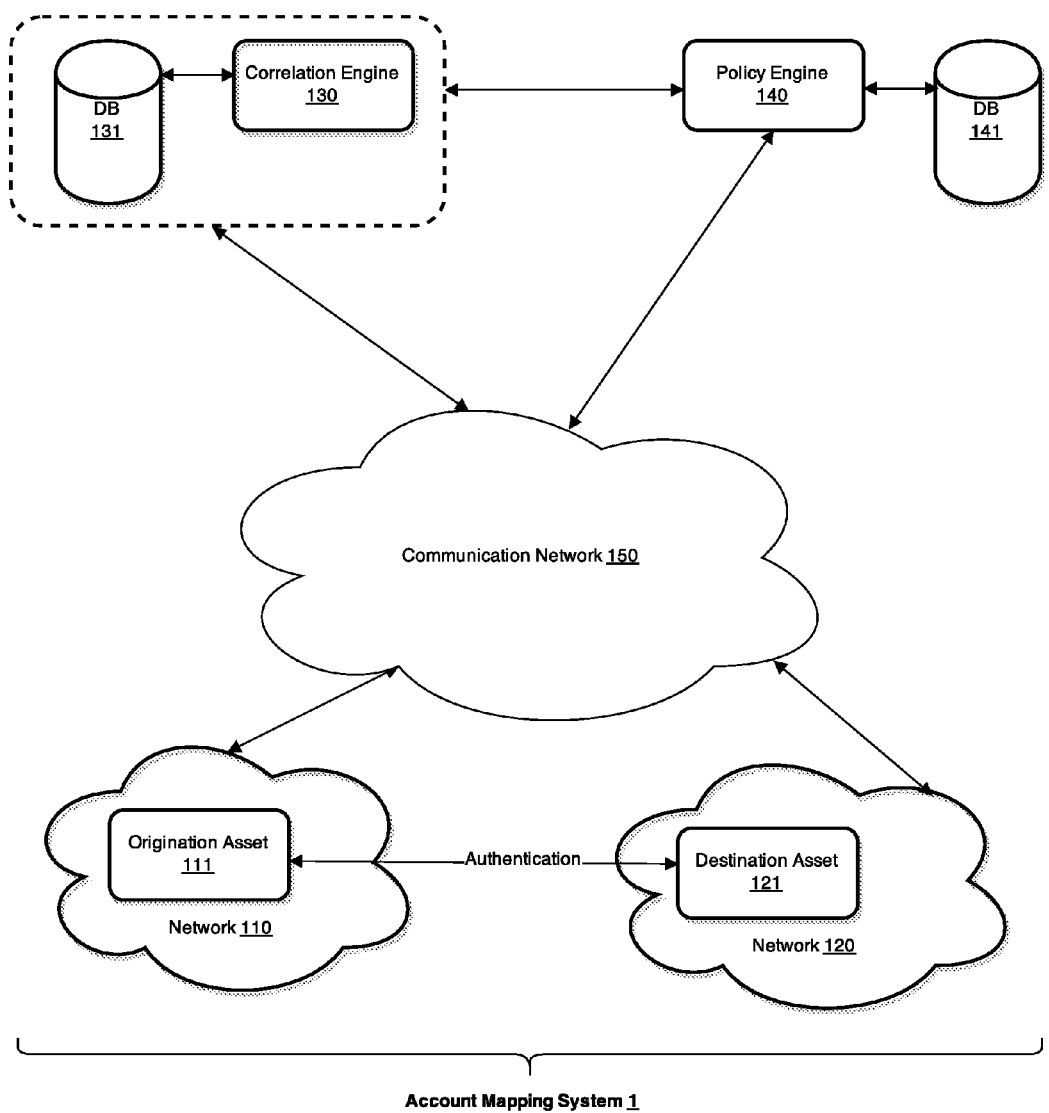
FIG. 1 illustrates a system that utilizes account lateral movement mapping to manage a network according to an exemplary embodiment of the invention.

An exemplary system for utilizing account lateral movement mapping data to manage a network is illustrated in FIG. 1. System 1 as depicted includes Network 110, Network 120, Correlation Engine 130, a Policy Engine 140, and Communication Network 150, although one of ordinary skill would recognize that System 1 may include multiple copies of these components and, in particular, multiple networks each comprising a plurality of interconnected assets.

Network 110 and Network 120 each are comprised of network assets. In the exemplary embodiments described herein, the network assets are identified as falling into the category of Origination Asset 111 or Destination Asset 121 in the context of an authentication process. However, network assets may be anything that is part of, relates to, or supports information-related activities. Network assets may include hardware devices (e.g., servers, switches, and general purpose computers), software, databases, and combinations thereof. A particular pair of network assets designated as Origination Asset 111 and Destination Asset 121 could exchange roles as the asset originating an authentication request and the asset receiving an authentication request.

Correlation Engine 130 has access to a Database 131. The Correlation Engine 130 is operable to correlate account information in order to generate the account lateral movement mapping data that is used in embodiments of the present invention. The Database 131 may be used to store the account lateral movement mapping data as well as other data used in the correlation process.

Correlation Engine 130 is in communication with Origination Asset 111, Destination Asset 121, and Policy Engine 140 via Communication Network 150. Event logs for Origination Asset 111 and Destination Asset 121 are transferred to Correlation Engine 130 over Communication Network 150. Correlation Engine 130 transfers account lateral movement mapping data to the Policy Engine 140.

Collection of the event logs maybe accomplished using any technique that preserves the information that would assist with generating account lateral movement mapping data. In one exemplary embodiment the System 1 collects the event logs by authenticating to management protocols of the network assets using administrative credentials. One example of a management protocol is Windows™ Management Instrumentation. Other implementations of the Web-Based Enterprise Management (WBEM) and Common Information Model (CIM) standards from the Distributed Management Task Force (DMTF) may also be used, such as, Web-Based Enterprise Management Solutions, Web-Based Enterprise Management Services, OpenPegasus, and Open Web-Based Enterprise Management.

In one exemplary embodiment the Correlation Engine 130 includes the functionality to collect the event logs using the techniques described herein. In another embodiment, one or more third-party administrative tools collect the event logs, and the Correlation Engine 130 interfaces with the third-party administrative tools.

The event logs may include any information that would assist with generating account lateral movement mapping data. In an exemplary machine-to-machine authentication process, the event data logged in an event log for the asset originating the authentication request (e.g., Origination Asset 111) includes the local account used and identifying information for the destination asset (e.g., Destination Asset 121). Similarly, the event data logged in an event log for the destination asset (e.g., Destination Asset 121) includes the local account used and identifying information for the asset originating the authentication request (e.g., Origination Asset 121). Accordingly, based on such event logs the Correlation Engine 130 may determine that the account on the originating asset—e.g., account 'X'—is correlated to the account authenticated to at the destination asset—e.g., account 'Y'.

Correlation Engine 130 and Policy Engine 140 may be special purpose hardware, special purpose software running on a general purpose hardware, or some combination thereof, that operates on or communicates with the Networks 110 and 120 and Origination Asset 111 and Destination Asset 121 in the manners described herein including, in the case of Policy Engine 140, to regulate account activity, including machine-to-machine authentication.

Policy Engine 140 includes an interface (not shown) that allows users, typically system administrators, to specify and modify the policies enforced by Policy Engine 140. Policy Engine 140 also uses the account lateral movement mapping data to specify and modify its policies and to enable management of the System 1. Policy Engine 140 is linked to a Database 141 that stores the policy rules and other relevant information for the Policy Engine 140.

Each of Database 131 and Database 141 may be a searchable database and may comprise, include or interface to a relational database or noSQL database (such as Cassandra NoSQL). Other databases, such as a query format database, a Structured Query Language (SQL) database, a storage area network (SAN), or another similar data storage device, query format, platform or resource may be used. Database 131 and Database 141 may each comprise a single database or a collection of databases, dedicated or otherwise. In one embodiment, Database 131 and Database 141 may store or cooperate with other databases to store the various data and information described herein. In some embodiments, Database 131 and Database 141 may comprise a file management system, program or application for storing and maintaining data and information used or generated by the various features and functions of the systems and methods described herein.

As noted above, Communication Network 150 may communicably link the various modules and devices noted in System 1. The Communication Network 150 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communication Network 150 may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link.

In some embodiments, Communication Network 150 may comprise a satellite communications network; such as a direct broadcast communication system (DBS) having the requisite number of dishes, satellites and transmitter/receiver boxes, for example. Network 300 may also comprise a telephone communications network, such as the Public Switched Telephone Network (PSTN). In another embodiment, Communication Network 150 may comprise a Personal Branch Exchange (PBX), which may further connect to the PSTN.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Figure 2:
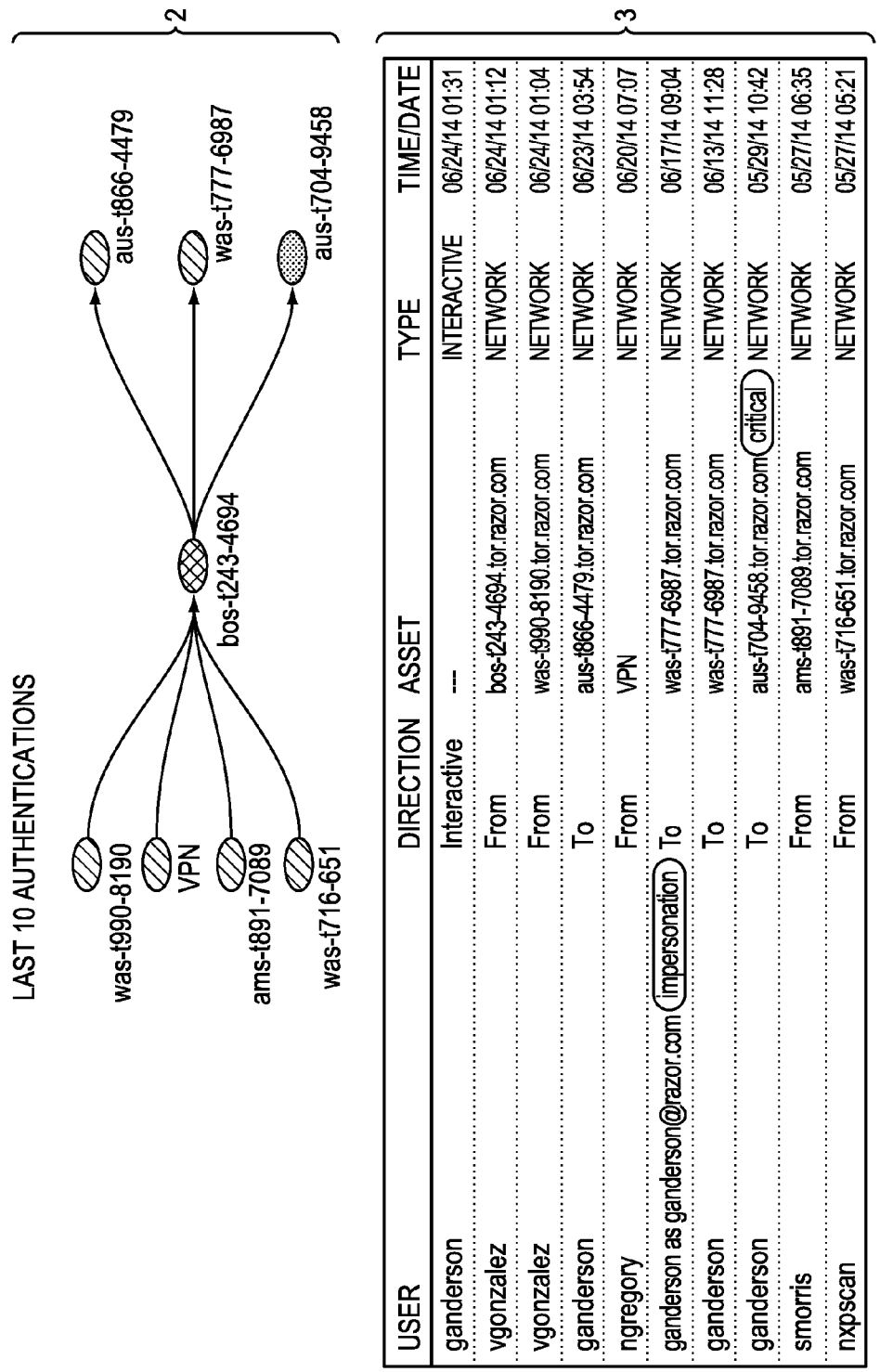
FIG. 2 illustrates a process for gathering account information and correlating accounts to facilitate account lateral movement mapping according to an exemplary embodiment of the invention.

FIG. 2 illustrates an example of account lateral movement mapping data organized graphically. In one exemplary embodiment of the invention, this representation is generated and displayed as part of a graphical user interface (GUI). The GUI may be displayed for a system administrator account for the Correlation Engine 130, the Policy Engine 140, or on a workstation or server that is remote from both the Correlation Engine 130 and the Policy Engine 140 and having administrative access thereto. Within Element 2, each solid circle represents a network asset, and each directional arrow represents an event (e.g., authentication) involving the two graphically-connected network assets.

Associated with each event is event data. Exemplary event data is displayed in Element 3. In this example, 'ngregory' authenticated to 'bos-t243-4694' from a VPN controller. Further, 'ganderson' authenticated to 'bos-t243-4694' from the login screen and keyboard (i.e. interactive). Finally, 'ganderson' authenticated to 'was-t777-6987' as a different account, 'ganderson@razor.com,' and the type of authentication was unknown.

Upon selecting an asset, the event information displayed 3 transitions to the event information associated with the selected asset. Accordingly, an operator following interconnected network assets by moving a cursor laterally, following the directional arrows, can observe a user accessing multiple assets through multiple accounts, with multiple "account switches" being observed, stored, and used to enforce policies for the assets and the networks of which they are a part.

Figure 3:
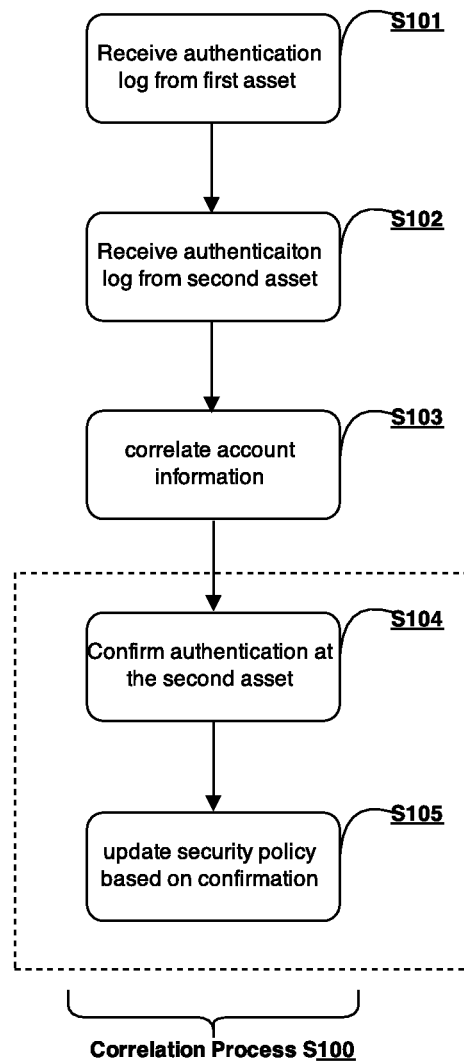
FIG. 3 illustrates a process for utilizing account lateral movement mapping to enable authentication policies according to an exemplary embodiment of the invention.

An exemplary operation of the System 1 will now be described with reference to FIGS. 3-5. Turning first to FIG. 3, an exemplary Correlation Process S100 is illustrated with reference to Steps S101 through S105. First, the Correlation Engine 130 receives event logs, including authentication logs, from a plurality of assets, including the Origination Asset 111 and the Destination Asset 112 (S101 and S102). The Correlation Engine 130 generates account lateral mapping data by correlating the information in the event logs from the Origination Asset 111 and the Destination Asset 112 (S103). This information may be stored as a record.

Steps S104 and S105 are called out with a dashed box in FIG. 3 because they relate to a confirmatory step to generate and update policies related to networks and assets. Upon correlating account 'X' and account 'Y,' i.e., two different accounts utilized by a single user to access two different network assets, the Correlation Engine 130 prompts an operator, for example, a system admin, to confirm whether the authentication is permitted (S104). The prompt may be sent using known communication techniques over Communication Network 150, including without limitation to an administrative interface, an e-mail address, a secure messaging system account, the monitoring application hosting the database, or other similar applications.

If the indication from the operator is that the authentication was not permitted, the operator may be prompted for additional policy making information. For example, the operator may indicate that the reason that the authentication is not permitted is related to one or more of the identity of the Origination Asset 111, the account used on the Origination Asset 111, the identity of the Destination Asset 111, the account used on the Destination Asset 111, the identity of the Network 110 or the Network 120. Further, the reason may be related to specific classes that the accounts, assets, or networks belong to, including user groups or security level classes.

Based on the operator responses to the confirmatory prompts, the Policy Engine 140 may update its policies as they relate to the affected networks, assets, accounts, etc., and combinations thereof (S105). In one exemplary embodiment the Correlation Engine 130 may prompt the operator and send the operator's responses, possibly after processing or formatting, to the Policy Engine 140. In another exemplary embodiment the Policy Engine 140 may itself prompt the operator for information used by the Policy Engine 140 to formulate policy.

Figure 4:
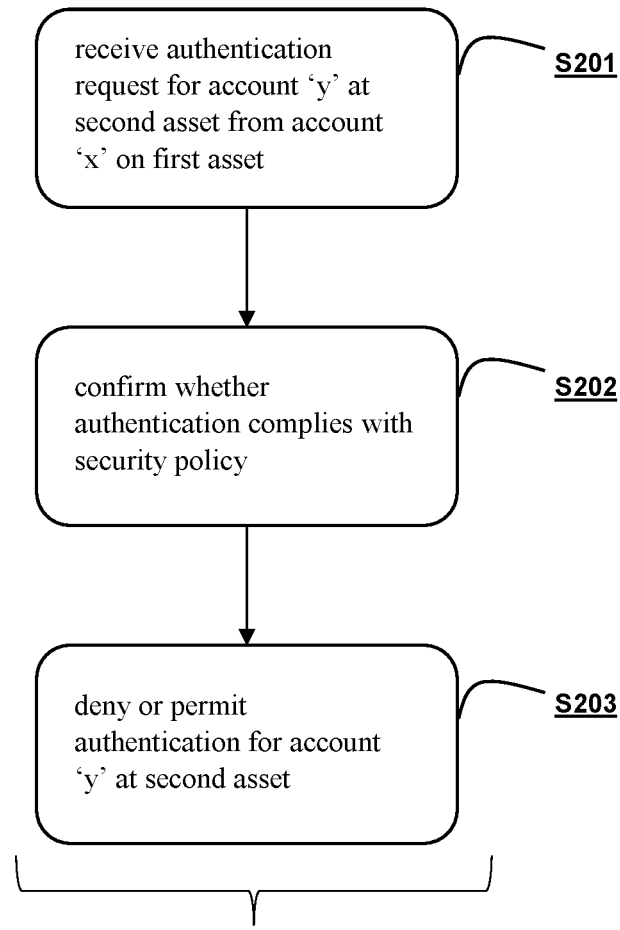
FIG. 4 illustrates a process for utilizing account lateral movement mapping to enforce authentication policies according to an exemplary embodiment of the invention.

An exemplary Policy Enforcement Process S200 is described in FIG. 4 and steps S201 through S203. In this exemplary Process S200, an authentication request for account 'Y' is received at a destination asset (S201). The request is for machine-to-machine authentication, and account 'X' is used at the originating asset for the request. Any number of policy rules may apply to this authentication request. If the relevant policies apply (S202) then the authentication request may be denied or accepted (S203). In other embodiments, an alert may also be generated. In some cases, only an alert may be generated and the authentication request may be allowed to proceed even if it violates a defined policy.

Figure 5:
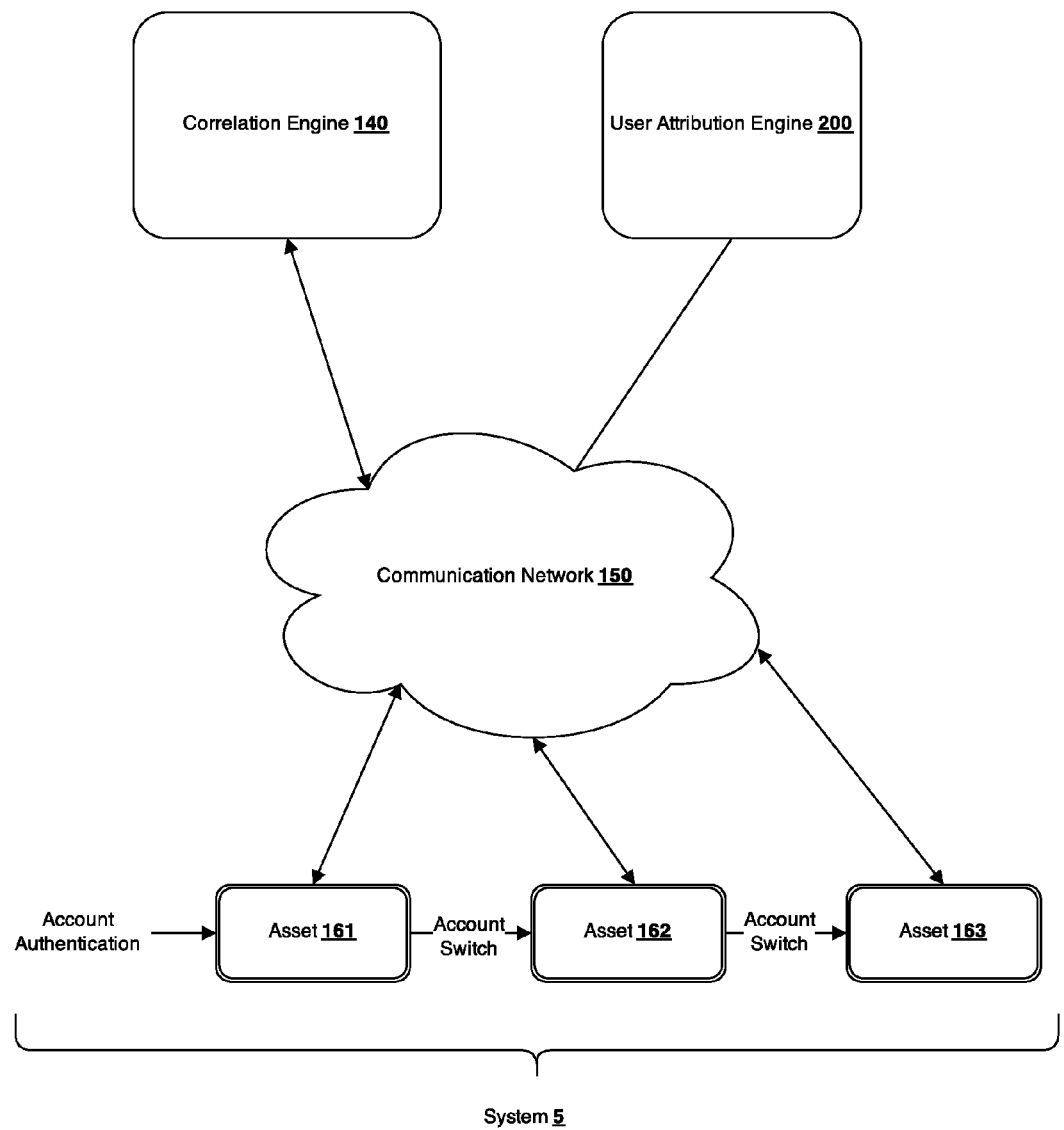
FIG. 5 illustrates a system utilizing account lateral movement mapping to manage a network according to an exemplary embodiment of the invention.

FIG. 5 illustrates System 5, which includes a User Attribution Engine 200 and a Correlation Engine 140. The System 5 may interact with User Attribution Engine 200 in order to attribute events with specific user identity or identities.

The User Attribution Engine 200 has access to a Database (not shown) that is an identity store with information associating accounts with Internet protocol (IP) addresses and host names. In one exemplary embodiment the identity store is compatible with the Lightweight Directory Access Protocol (LDAP).

Several sources may be used to associate accounts with IP addresses and host names. When a device joins a local network, it may be assigned an IP address. For example, the device may be authenticated using dynamic host configuration protocol (DHCP) to determine if it is eligible to be assigned an IP address. For each DHCP lease, the User Attribution Engine 200 logs the host name and leased IP address. Each time a DHCP lease is renewed or reassigned the host name and the IP address associated with the lease is updated in the system. In this manner, DHCP leases are tracked in real-time for host name and IP addresses associated with account information.

A device may join a private network over a public network and send data as if connected to the private network by way of a virtual private network (VPN). When a device authenticates to a VPN, the VPN assigns the device an IP address. The User Attribution Engine 200 tracks VPN sessions as they are created and ended. The IP address assigned to a device during a VPN session may be stored as well as the account used to connect to the VPN and other event data.

In one embodiment, the User Attribution Engine 200 may also track internal authentications. For Active Directory and similar authentication tools and domain authentication tools, the IP address and/or host name associated with the authentication is tracked. Using the IP address and account information stored by the User Attribution Engine 200, the account information may be associated with authentication operations at the system level.

Accordingly, event information including IP addresses may be tracked back to a specific account even in the event of multiple "account switches"—as illustrated in Assets 161, 162, and 163—based on the User Attribution System 200 and the account lateral movement mapping data generated and stored by the Correlation Engine 140.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The System 1 may include a plurality of software processing modules stored in a memory as described above and executed on a processor in the manner described herein. The program modules may be in the form of any suitable programming language, which is converted to machine language or object code to allow the processor or processors to read the instructions.

The computer system may include a general-purpose computing device in the form of a computer including a processing unit, a system memory, and a system bus that couples various system components including the system memory to the processing unit.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

The computing environment may also include other removable/non-removable, volatile/nonvolatile computer storage media.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method of monitoring a network, the method comprising:
   retrieving, via a processing module, a first log from an origination asset
   identifying, via the processing module, a destination asset for a first authentication transaction from the first log;
   retrieving, via the processing module, a second log from the destination asset;
   identifying the origination asset in a second authentication transaction from the second log;
   identifying, via the processing module, that a single user is responsible for the first and second authentication transactions accessing a plurality of assets on the network utilizing multiple accounts; and
   generating, via the processing module, a notification based on a comparison of the identified single user and a database of individual users, each individual user associated with multiple accounts.

2. The method of monitoring the network according to claim 1, wherein identifying a single user comprises associating a first account from the origination asset with a second account from the destination asset.

3. The method of monitoring the network according to claim 1, wherein the origination asset and the destination asset are network devices.

4. The method of monitoring the network according to claim 1, wherein the database of individual users comprises permitted account switches at a single network asset.

5. The method of monitoring the network according to claim 1, further comprising generating a visual map of the identified single users.

6. A system for monitoring a network, the system comprising:
a database of individual users;
a processing module in communication with the database; and
memory storing instructions configured to instruct the processing module to retrieve a first log from an origination asset, identify a destination asset for a first authentication transaction from the first log, retrieve a second log from the destination asset, identify the origination asset in a second authentication transaction from the second log, identify that a single user is responsible for the first and second authentication transactions accessing a plurality of assets on the network-utilizing multiple accounts; and, generate a notification based on a comparison of the identified single user and the database of individual users, each individual user associated with multiple accounts.

7. The system for monitoring the network according to claim 6, wherein the processing module is further configured to update the database of individual users based on a user response to the notification.

8. The system for monitoring the network according to claim 6, wherein audit wherein the single user is identified by associating a first account from the origination asset with a second account from the destination asset.

9. The system for monitoring the network according to claim 6, wherein the origination asset and the destination asset are network devices.

10. The system for monitoring the network according to claim 6, wherein the database of individual users comprises permitted account switches at a single network asset.

11. The system for monitoring the network according to claim 10, wherein the permitted account switches are based on account information and device information.

12. The system for monitoring the network according to claim 6, further comprising a second database associating at least one device label with user information.

13. The system for monitoring the network according to claim 12, wherein a user is identified based on the second database and an authentication record.

14. The system for monitoring the network according to claim 13, wherein the authentication record is an active directory log.

15. The system for monitoring the network according to claim 12, wherein the device label is a domain name or an Internet protocol address.

16. The system for monitoring the network according to claim 12, wherein the second database is updated upon a dynamic host configuration protocol lease renewal, a virtual private network internet protocol address assignment, or both.

17. The system for monitoring the network according to claim 6, wherein the plurality of assets are part of an organization's internal network.

* * * * *